(12) United States Patent
Kitayama et al.

(10) Patent No.: US 11,667,105 B2
(45) Date of Patent: Jun. 6, 2023

(54) LAMINATE, SHOE SOLE, AND SHOE

(71) Applicant: ASICS CORPORATION, Kobe (JP)

(72) Inventors: Hironori Kitayama, Kobe (JP); Junichiro Tateishi, Kobe (JP); Kenichi Harano, Kobe (JP)

(73) Assignee: ASICS CORPORATION, Kobe (JP)

( * ) Notice: Subject to any disclaimer, the term of this patent is extended or adjusted under 35 U.S.C. 154(b) by 400 days.

(21) Appl. No.: 16/646,036

(22) PCT Filed: Sep. 15, 2017

(86) PCT No.: PCT/JP2017/033488
§ 371 (c)(1),
(2) Date: Mar. 10, 2020

(87) PCT Pub. No.: WO2019/053885
PCT Pub. Date: Mar. 21, 2019

(65) Prior Publication Data
US 2020/0262156 A1    Aug. 20, 2020

(51) Int. Cl.
*B32B 7/023* (2019.01)
*B29C 65/16* (2006.01)
(Continued)

(52) U.S. Cl.
CPC .............. *B32B 7/023* (2019.01); *A43D 25/00* (2013.01); *B29C 65/1635* (2013.01);
(Continued)

(58) Field of Classification Search
None
See application file for complete search history.

(56) References Cited

U.S. PATENT DOCUMENTS 7,244,330 B2   7/2007  Boywitz et al.
2005/0279738 A1* 12/2005 Itakura ............... B29C 65/1654
                                                  219/121.64
(Continued)

FOREIGN PATENT DOCUMENTS

CN    102725129 A    10/2012
EP      2489496 A1    8/2012
(Continued)

OTHER PUBLICATIONS

Juhl Thomas Brokholm et al., "Predicting the laser weldability of dissimilar polymers", Polymer, May 31, 2013, pp. 3891-3897, vol. 54, Elsevier, XP028574991, ISSN: 0032-3861.
(Continued)

*Primary Examiner* — Chinessa T. Golden
(74) *Attorney, Agent, or Firm* — Studebaker & Brackett PC

(57) ABSTRACT

A laminate of the present invention includes a first member which contains a thermoplastic polymer and through which laser light is transmitted and a second member which contains a thermoplastic polymer and absorbs laser light, wherein the first member is directly bonded to the second member, and A represented by the formula 1: $A=-9 \times D+ Wa-45$ is more than zero. D represents a distance between a Hansen solubility parameter of the thermoplastic polymer of the first member and a Hansen solubility parameter of the thermoplastic polymer of the second member, and Wa represents work of adhesion calculated from each surface free energy of the first member and the second member. Such a first member and a second member are firmly bonded to each other without using a bonding sheet.

4 Claims, 4 Drawing Sheets

(51) Int. Cl.
  B29C 65/00 (2006.01)
  A43D 25/00 (2006.01)
  B32B 27/06 (2006.01)
  B32B 27/18 (2006.01)
  B29K 101/12 (2006.01)
  B29L 31/50 (2006.01)
  B32B 5/18 (2006.01)
  A43B 1/14 (2006.01)
  A43B 13/02 (2022.01)
  A43B 13/04 (2006.01)
  A43B 13/12 (2006.01)

(52) U.S. Cl.
  CPC ............ B29C 66/71 (2013.01); B32B 27/065 (2013.01); B32B 27/18 (2013.01); *A43B 1/14* (2013.01); *A43B 13/02* (2013.01); *A43B 13/04* (2013.01); *A43B 13/12* (2013.01); *B29C 66/1122* (2013.01); *B29C 66/73921* (2013.01); *B29K 2101/12* (2013.01); *B29K 2995/0027* (2013.01); *B29L 2031/50* (2013.01); *B32B 5/18* (2013.01); *B32B 2266/025* (2013.01); *B32B 2307/4026* (2013.01); *B32B 2437/02* (2013.01)

(56) References Cited

U.S. PATENT DOCUMENTS

| | | |
|---|---|---|
| 2007/0051460 A1 | 3/2007 | Boywitz et al. |
| 2007/0084551 A1 | 4/2007 | Watanabe et al. |
| 2012/0204446 A1 | 8/2012 | Tateishi et al. |

FOREIGN PATENT DOCUMENTS

| | | |
|---|---|---|
| EP | 3 178 340 A1 | 6/2017 |
| JP | 2005-271206 A | 10/2005 |
| JP | 2007-111931 A | 5/2007 |
| JP | 2008-511467 A | 4/2008 |
| JP | 4241733 B2 | 3/2009 |
| JP | 2009-173023 A | 8/2009 |
| JP | 2009-269401 A | 11/2009 |
| JP | 2010-137368 A | 6/2010 |
| WO | 2011/045856 A1 | 4/2011 |
| WO | 2016/021023 A1 | 2/2016 |
| WO | 2016/117504 A1 | 7/2016 |

OTHER PUBLICATIONS

The extended European search report issued by the European Patent Office dated Oct. 7, 2020, which corresponds to European Patent Application No. 17925071.7-1014 and is related to U.S. Appl. No. 16/646,036.

An Office Action mailed by China National Intellectual Property Administration dated May 11, 2021, which corresponds to Chinese Patent Application No. 201780094716.4 and is related to U.S. Appl. No. 16/646,036; with English language translation.

International Search Report issued in PCT/JP2017/033488; dated Dec. 19, 2017.

Office Action issued in JP 2019-541602; mailed by the Japanese Patent Office dated Feb. 4, 2020.

Communication pursuant to Article 94(3) EPC issued in EP 17 925 071.7 by the European Patent Office dated Sep. 6, 2022.

The Examination Report mailed by the IP Australia dated Nov. 18, 2022, which corresponds to Australian patent application No. 2017431565 and is related to U.S. Appl. No. 16/646,036.

* cited by examiner

LAMINATE, SHOE SOLE, AND SHOE

TECHNICAL FIELD

The present invention relates to a laminate in which two members are directly bonded by irradiation of laser light, and uses of the same.

BACKGROUND ART

A shoe is produced by bonding an each component such as a midsole and the like.

Patent Document 1 discloses a laminate for laser bonding having at least a three-layer structure and bonded by irradiation of laser light. Such a laminate includes an upper member having transparency to laser light, a lower member formed of a thermoplastic foam, and a bonding sheet interposed between the upper member and the lower member and melted by irradiation of laser light. A difference between a melting point of the lower member and a melting point of the bonding sheet is −50° C. to 20° C., and a difference between a melt viscosity of the lower member and a melt viscosity of the bonding sheet is $3.0 \times 10^5$ Pa·s to $8.0 \times 10^5$ Pa·s.

PRIOR ART DOCUMENT

Patent Document

Patent Document 1: WO 2011/045856 A1

SUMMARY OF THE INVENTION

The laminate for laser bonding of Patent Document 1 is preferable because the upper member and the lower member formed of the foam can be bonded in good condition with a bonding sheet interposed therebetween by irradiation of laser light.

However, in Patent Document 1, since the bonding sheet is used, not only the upper member and the lower member but also the bonding sheet must be prepared. That is, although objects to be bonded are originally the upper member and the lower member, the bonding sheet for bonding these members must be used. The use of the bonding sheet not only increases the raw material cost, but also requires an operation of sandwiching the bonding sheet between the upper member and the lower member, thereby increasing the production cost.

Problems to be Solved by the Invention

An object of the present invention is to provide a laminate or the like in which two members are firmly bonded by laser light without using a bonding sheet.

Solutions to the Problems

The present inventors have intensively studied for a novel purpose of directly bonding two members (a first member and a second member) by laser light without interposing a bonding sheet between the two members.

Unlike a bonding technique using an adhesive, the bonding using laser light involves melting a thermoplastic material and welding two materials. However, it is difficult to directly and firmly bond the two materials. In other words, in order for the two materials to be directly and firmly bonded by laser light, it is necessary to select materials suitable to each other; however, it is difficult to select such materials.

The present inventors have focused on a distance of a Hansen solubility parameter, which is a mixing index of two materials, as a welding factor by laser light, and work of adhesion which is energy required for the two materials to adhere and peel off. As a result of intensive study, it has been found that the distance of the Hansen solubility parameter and the work of adhesion were highly relevant to bonding strength using laser light, thereby completing the present invention.

A laminate of the present invention includes a first member which contains a thermoplastic polymer and through which laser light is transmitted and a second member which contains a thermoplastic polymer and absorbs laser light, wherein the first member is directly bonded to the second member, and A represented by the following formula 1 is more than zero, $$A = -9 \times D + Wa - 45 \quad \text{Formula 1:}$$

wherein D represents a distance between a Hansen solubility parameter of the thermoplastic polymer of the first member and a Hansen solubility parameter of the thermoplastic polymer of the second member calculated according to the following formula 2, Wa represents work of adhesion calculated from each surface free energy of the first member and the second member according to the following formula 3, $$D = \{4 \times (\delta_{d1} - \delta_{d2})^2 + (\delta_{p1} - \delta_{p2})^2 + (\delta_{h1} \delta_{h2})^2\}^{1/2} \quad \text{Formula 2:}$$

wherein $\delta_{d1}$, $\delta_{p1}$, and $\delta_{h1}$ represent a dispersion term, a polarity term, and a hydrogen bond term, respectively, in the Hansen solubility parameter of the thermoplastic polymer of the first member, $\delta_{d2}$, $\delta_{p2}$, and $\delta_{h2}$ represent a dispersion term, a polarity term, and a hydrogen bond term, respectively, in the Hansen solubility parameter of the thermoplastic polymer of the second member, $$Wa = 2 \times (\gamma_{d1} \times \gamma_{d2})^{1/2} + 2 \times (\gamma_{p1} \times \gamma_{p2})^{1/2} + 2 \times (\gamma_{h1} \times \gamma_{h2})^{1/2} \quad \text{Formula 3:}$$

wherein $\gamma_{d1}$, $\gamma_{p1}$, and $\gamma_{h1}$ represent a dispersion component, a polarity component, and a hydrogen bond component, respectively, in the surface free energy of the first member, and $\gamma_{d2}$, $\gamma_{p2}$, and $\gamma_{h2}$ represent a dispersion component, a polarity component, and a hydrogen bond component, respectively, in the surface free energy of the second member.

Preferably, the first member is formed of a non-foamed material, and the second member is formed of a foam.

In another aspect of the present invention, a shoe sole and a shoe are provided.

This shoe sole has an outsole, and the outsole includes one of the first member and the second member.

The shoe has the shoe sole.

Effects of the Invention

In a laminate of the present invention, the first member and the second member are firmly bonded without interposing a bonding sheet. Such a laminate can be manufactured relatively inexpensively. Since the first member and the second member are firmly bonded, the laminate of the present invention can be suitably used as a constituting member of a product such as a shoe sole, used in a severe environment.

EMBODIMENTS OF THE INVENTION

Figure 1:
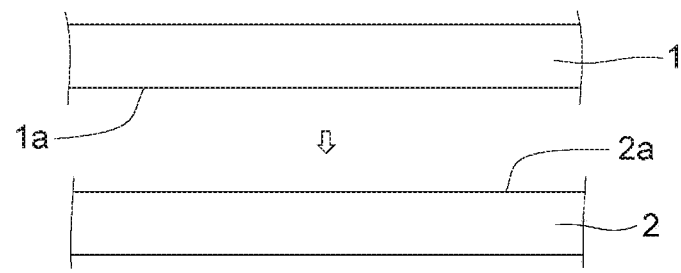
FIG. 1 is a reference side view showing a production process of a laminate of the present invention.

Hereinafter, the present invention will be described.

In this specification, as prefixes of the terms "first" and "second" may be added. These prefixes, however, are only added in order to distinguish the terms and do not have specific meaning such as order and relative merits. A numerical range represented by "lower limit X to upper limit Y" means the lower limit X or more and the upper limit Y or less. When a plurality of the numerical ranges are described separately, any lower limit and any upper limit can be selected, and a numerical range of "any lower limit to any upper limit" can be set. It should be noted that dimensions such as a thickness and a length in the drawings may be different from actual dimensions.

A laminate of the present invention includes at least two layers of members (first member and second member) directly laminated and bonded, and preferably includes only two layers of members (first member and second member) directly laminated and bonded. The first member contains a thermoplastic polymer, and laser light is transmitted through the first member. The second member contains a thermoplastic polymer and absorbs laser light.

In the present invention, A specified from a distance D of a Hansen solubility parameter of each thermoplastic polymer, contained in the first member and the second member, and work of adhesion Wa calculated according to each surface free energy of the first member and the second member is more than zero.

<First Member>

The first member contains a thermoplastic polymer and is formed of a material through which laser light can be transmitted. Hereinafter, the thermoplastic polymer contained in the first member may be referred to as "first thermoplastic polymer", and the thermoplastic polymer contained in the second member may be referred to as "second thermoplastic polymer".

The first thermoplastic polymer is not particularly limited as long as it is a material having thermoplasticity (material that can be melted by heat). Examples of the first thermoplastic polymer include thermoplastic resins, thermoplastic elastomers, and thermoplastic rubbers. For the first thermoplastic polymer, one selected from those described above may be used alone or those described above may be used in combination of two or more kinds.

Examples of the first thermoplastic resin include an olefin-based resin such as low density polyethylene, high density polyethylene, polypropylene, an ethylene-vinyl acetate copolymer (EVA), and an ethylene-α olefin copolymer; an ester-based resin such as polyethylene terephthalate and polybutylene terephthalate; a styrene-based resin such as polystyrene, an AS resin, and an ABS resin; an amide-based resin such as 6-nylon; a vinyl chloride-based resin; an acryl-based resin such as polymethylmethacrylate; and a vinyl acetate-based resin. These may be used alone or in combination of two or more kinds.

Examples of the thermoplastic elastomer include an olefin-based elastomer; a styrene-based elastomer such as a styrene butadiene styrene elastomer (SBS), a styrene isoprene styrene elastomer (SIS), a styrene ethylene butylene styrene elastomer (SEBS), and a hydrogenated styrene-based elastomer; a urethane-based elastomer; an ester-based elastomer; a fluorine-based elastomer; and a polyamide-based elastomer. These may be used alone or in combination of two or more kinds.

Examples of the thermoplastic rubber include a synthetic rubber such as a butadiene rubber (BR), an isoprene rubber (IR), and chloroprene (CR); a natural rubber (NR); and a copolymer rubber such as a styrene-butadiene rubber (SBR), a styrene-butadiene-styrene rubber (SBSR), an acrylonitrile-butadiene rubber (NBR), a styrene-isoprene copolymer (SIR), and a butyl rubber (IIR). These may be used alone or in combination of two or more kinds.

It should be noted that the thermoplastic elastomer and the thermoplastic rubber may not be clearly distinguished depending on the type.

In the first member, the content of the first thermoplastic polymer is not limited to a particular content, but the first member may not be bonded to the second member with sufficient bonding strength if the content of the thermoplastic polymer is too low. Accordingly, the blended amount of the first thermoplastic polymer is normally 60% by mass or more and preferably 70% by mass or more, based on 100% by mass of the entire first member. On the other hand, the upper limit of the blended amount of the first thermoplastic polymer is theoretically 100% by mass.

The first member may or may not have a rubber elasticity. Preferably, the first member having a rubber elasticity is used. For example, by using a thermoplastic elastomer or a thermoplastic rubber as the first thermoplastic polymer, the first member having a rubber elasticity can be easily formed.

The first member may be formed of a foam or a non-foamed material. Preferably, the first member is non-foamed. When the first member is formed of a foam, details of a method for forming the foam and the like will be described in the section of <Second member> below.

The first thermoplastic polymer contained in the first member may or may not be crosslinked.

When a thermoplastic polymer is crosslinked, the crosslinking method is not limited to a particular method, and examples thereof include electron radiation crosslinking and chemical crosslinking. Examples of electron radiation include an X ray, an α-ray, a β-ray, and a γ-ray. In the case of chemical crosslinking, a crosslinker such as a peroxide is blended in the thermoplastic polymer.

A material for forming the first member is not particularly limited as long as it contains the first thermoplastic polymer. For example, the first member may be formed only of the first thermoplastic polymer, or may contain the first thermoplastic polymer and various additives.

Examples of the additives include a softener, a crosslinking agent, a crosslinking aid, a filler, a weathering agent, an antioxidant, an ultraviolet absorber, a lubricant, an antistatic agent, a dispersant, and a foaming agent.

Examples of the softener include a mineral oil such as a process oil and an extender oil; and a vegetable oil such as a tall oil fatty acids, a castor oil and a linseed oils. Examples of the crosslinking agent include an organic peroxide, a maleimide-based crosslinking agent, sulfur, a phenol-based crosslinking agent, oximes, and polyamine. Examples of the crosslinking aid include a fatty acid, zinc oxide, divinylbenzene, trimethylol propane trimethacrylate, 1,6-hexanediol methacrylate, 1,9-nonanediol dimethacrylate, 1,10-decanediol dimethacrylate, trimellitic acid triallyl ester, and triallyl isocyanate. Examples of the filler include silica, calcium carbonate, magnesium carbonate, and magnesium oxide.

The laser light transmittance of the first member is preferably as high as possible. Specifically, the laser light transmittance of the first member is at least 10% or more, preferably 20% or more, and more preferably 30% or more. The upper limit of the laser light transmittance of the first member is theoretically 100%.

Here, the transmittance is a transmittance of laser light when the first member has a thickness of 2 mm and is irradiated with the laser light having a wavelength of 808 nm. The transmittance may be measured using, for example, a laser power meter (product name "NOVA II" manufactured by OPHIR Optronics Ltd.).

An absorbent that can absorb laser light may be blended in the first member. However, in order for laser light to sufficiently act on the second member, the first member preferably does not substantially contain an absorbent that can absorb laser light.

The thickness of the first member is not limited to a particular thickness, and may be set to an appropriate thickness according to the intended use. If the thickness of the first member is too small, however, the first member may be perforated by heat during irradiation of laser light. From such a viewpoint, the thickness of the first member is preferably 1 mm or more, and more preferably 1.5 mm or more. The upper limit of the thickness of the first member may be such that the transmission of laser light is not impaired. For example, the thickness of the first member is 50 mm or less.

The first member can be obtained by molding a material, containing the first thermoplastic polymer and various additives blended as required, by a conventionally known method such as a melt press method.

<Second Member>

The second member contains the second thermoplastic polymer and is formed of a material that can absorb laser light.

The second thermoplastic polymer is not particularly limited as long as it is a material having thermoplasticity (material that can be melted by heat). Examples of the second thermoplastic polymer include a thermoplastic resin, a thermoplastic elastomer, and a thermoplastic rubber. For the second thermoplastic polymer, one selected from those described above may be used alone or those described above may be used in combination of two or more kinds.

Examples of the thermoplastic resin, the thermoplastic elastomer, and the thermoplastic rubber of the second thermoplastic polymer include those exemplified in the first thermoplastic polymer in the section of <First member> described above.

The first thermoplastic polymer and the second thermoplastic polymer may be the same polymer, may be the same type of polymer, or may be different polymers.

A material for forming the second member is not particularly limited as long as it contains the second thermoplastic polymer. For example, the second member may be formed only of the second thermoplastic polymer, or may contain the second thermoplastic polymer and various additives. Examples of the additives include those as exemplified in the section of <First member> described above.

The second member may or may not have a rubber elasticity. Preferably, the second member having a rubber elasticity is used. For example, by using a thermoplastic elastomer or a thermoplastic rubber as the second thermoplastic polymer, the second member having a rubber elasticity can be easily formed.

In order to generate heat during irradiation of laser light, an absorbent that can absorb laser light is blended in the second member. The absorbent refers to an agent which, when added, can increase the laser absorptivity. Examples of the absorbent include an inorganic pigment such as carbon black and an oxide-based pigment; an organic pigment such as a phthalocyanine-based pigment, a lake pigment, and a polycyclic pigment; and dye having an absorption wavelength appropriate for laser light to be used.

The blended amount of the absorbent is not limited to a particular amount, but is normally 0.1% by mass to 15% by mass based on 100% by mass of the entire second member.

In the second member, the content of the second thermoplastic polymer is not particularly limited, but the second member may not be bonded to the first member with sufficient bonding strength if the content of the thermoplastic polymer is too low. Accordingly, the blended amount of the second thermoplastic polymer is normally 60% by mass or more and preferably 70% by mass or more, based on 100% by mass of the entire second member. On the other hand, the upper limit of the blended amount of the second thermoplastic polymer is theoretically 100% by mass, but is actually 99.9% by mass or less.

The second member may be formed of a foam or a non-foamed material. Preferably, the second member is formed of a foam. The second member formed of a foam has air bubbles. The second member has an uneven surface based on the air bubbles. In other words, on the surface of the second member, there exist an infinite number of small recesses in relation to air bubbles. A skin layer may be formed on the surface of the second member in order that the surface of the second member is made flat.

The foam is obtained by foaming a material containing a thermoplastic polymer. Examples of the foaming process include conventional known processes such as chemical foaming, physical foaming, and mechanical foaming processes. An appropriate foaming agent is blended as required in accordance with these foaming processes.

The density of the foam (apparent density) is not limited to a particular density. If the density is too low or too high, however, a foam having a satisfactory elasticity cannot be obtained. From such a viewpoint, the density (apparent density) of the foam is preferably 0.05 $g/cm^3$ to 0.8 $g/cm^3$.

The thickness of the second member is not limited to a particular thickness, and may be set to an appropriate thickness according to the intended use. If the thickness of the second member is too small, however, the second member may be perforated by heat during irradiation of laser light. From such a viewpoint, the thickness of the second member is preferably 1 mm or more, and more preferably 1.5 mm or more.

The second member can be obtained by molding a material, containing the second thermoplastic polymer, an absorbent, and various additives blended as required, by a conventionally known method such as a melt press method.

<Hansen Solubility Parameter and Work of Adhesion>

As the first member and the second member, those in which A represented by the formula 1 is more than zero are used.

$$A = -9 \times D + Wa - 45 \qquad \text{Formula 1:}$$

In the formula 1, D represents a distance between a Hansen solubility parameter of the thermoplastic polymer of the first member and a Hansen solubility parameter of the thermoplastic polymer of the second member calculated according to the following formula 2. In the formula 1, Wa represents work of adhesion calculated from each surface free energy of the first member and the second member according to the following formula 3.

$$D = \{4 \times (\delta_{d1} - \delta_{d2})^2 + (\delta_{p1} - \delta_{p2})^2 + (\delta_{h1} \delta_{h2})^2\}^{1/2} \qquad \text{Formula 2:}$$

$$Wa = 2 \times (\gamma_{d1} \times \gamma_{d2})^{1/2} + 2 \times (\gamma_{p1} \times \gamma_{p2})^{1/2} + 2 \times (\gamma_{h1} \times \gamma_{h2})^{1/2} \qquad \text{Formula 3:}$$

In the formula 2, $\delta_{d1}$, $\delta_{p1}$, and $\delta_{h1}$ represent a dispersion term, a polarity term, and a hydrogen bond term, respectively, in the Hansen solubility parameter of the thermoplastic polymer of the first member, $\delta_{d2}$, $\delta_{p2}$, and $\delta_{h2}$ represent a dispersion term, a polarity term, and a hydrogen bond term, respectively, in the Hansen solubility parameter of the thermoplastic polymer of the second member.

In the formula 3, $\gamma_{d1}$, $\gamma_{p1}$, and $\gamma_{h1}$ represent a dispersion component, a polarity component, and a hydrogen bond component, respectively, in the surface free energy of the first member, and $\gamma_{d2}$, $\gamma_{p2}$, and $\gamma_{h2}$ represent a dispersion component, a polarity component, and a hydrogen bond component, respectively, in the surface free energy of the second member.

As $\delta_{d1}$, $\delta_{p1}$, and $\delta_{h1}$ (a dispersion term, a polarity term, and a hydrogen bond term of the first thermoplastic polymer) and $\delta_{d2}$, $\delta_{p2}$, and $\delta_{h2}$ (a dispersion term, a polarity term, and a hydrogen bond term of the second thermoplastic polymer), literature data may be employed. However, in the present invention, a value obtained by calculating the Hansen solubility parameter based on a structure of a polymer is employed.

The Hansen solubility parameter of the first thermoplastic polymer and the Hansen solubility parameter of the second thermoplastic polymer can be calculated at a temperature of 23° C.±2° C. using the software named as "HSPiP" based on the solubility parameter calculation method. See the Examples section for the details of the calculation method of the Hansen solubility parameter.

$y_{d1}$, $y_{p1}$, and $y_{h1}$ (a dispersion component, a polarity component, and a hydrogen bond component of the first member) and $\gamma_{d2}$, $\gamma_{p2}$, and $\gamma_{h2}$ (a dispersion component, a polarity component, and a hydrogen bond component of the second member) refer to values obtained by measuring each surface free energy of a joint surface of the first member and a joint surface of the second member.

In the measurement of the surface free energy, the surface free energy can be obtained by adhering water, diiodomethane, and ethylene glycol to the joint surface of the first member and the joint surface of the second member at a temperature of 23° C.±2° C. and measuring a contact angle using a contact angle meter. See the Examples section for the details of the measurement method of the surface free energy.

As described later, in a state of a laminate, the joint surface of the first member and the joint surface of the second member are firmly bonded. For that reason, in the state of the laminate, it is difficult to measure each surface free energy of the joint surface of the first member and the joint surface of the second member. Thus, when each surface free energy of the first member and the second member is measured in the state of the laminate, each of the first member and the second member is cut, and the surface free energy at each cut surface shall be measured.

<Laminate and its Producing Method>

A method of producing the laminate of the present invention includes a step of superimposing the first member and the second member, and a step of applying laser light from the first member side of the superimposed double object.

Specifically, as shown in FIG. 1, a first member 1 and a second member 2 formed in a desired shape are prepared. The first member 1 and the second member 2 are superimposed so that a lower surface of the first member 1 and an upper surface of the second member 2 are in direct contact (see FIG. 2). The surfaces that overlap each other are a joint surface 1a of the first member 1 and a joint surface 2a of the second member 2. In the illustrated example, the lower surface of the first member 1 is the joint surface 1a of the first member 1, and the upper surface of the second member 2 is the joint surface 2a of the second member 2.

Figure 2:
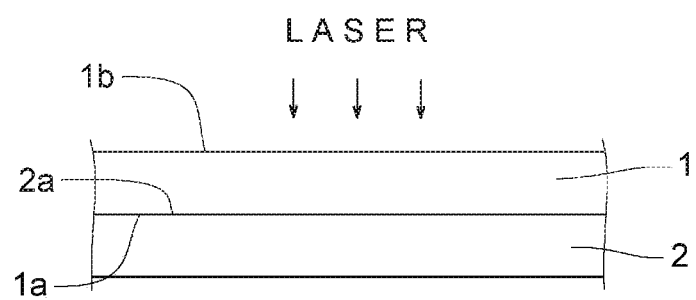
FIG. 2 is a reference side view of FIG. 1.

With respect to the paper sheets of FIGS. 1 and 2, the first member 1 and the second member 2 are stacked in a state where the lower surface (joint surface) of the first member 1 is in contact with the upper surface (joint surface) of the second member 2, or vice versa. That is, the first member 1 and the second member 2 may be stacked in a state where the lower surface of the second member 2 is in direct contact with the upper surface of the first member 1 (not shown).

The joint surface 1a of the first member 1 and the joint surface 2a of the second member 2 may be independently formed as uneven surfaces. However, since both joint surfaces can be entirely brought into close contact with each other, the joint surface 1a of the first member 1 and the joint surface 2a of the second member 2 are preferably both smooth. The smooth surface includes a flat surface and a smooth curved surface.

Then, laser light is applied from the first member 1 side (a surface 1b side opposite to the joint surface 1a of the first member 1) of the superimposed double object.

The wavelength of the laser light to be applied is 780 nm to 1000 nm, and usually laser light having a wavelength of 808 nm is used. The irradiation rate of laser light is appropriately suitably set according to materials for forming the first member 1 and the second member 2, and is, for example, 3 mm/sec to 15 mm/sec. The output of laser light is preferably 100 W to 625 W in total using 4 to 50 diodes each having 3 W to 25 W.

The laser light is transmitted in a thickness direction of the first member 1 and reaches the second member 2. Since an absorbent of the second member 2 absorbs the laser light, the second member 2 generates heat. This heat melts the second thermoplastic polymer and, at the same time, is transmitted to melt the first thermoplastic polymer. After heat radiation, the first thermoplastic polymer and the second thermoplastic polymer are solidified again, so that a laminate in which the first member 1 and the second member 2 are directly bonded is obtained.

Figure 3:
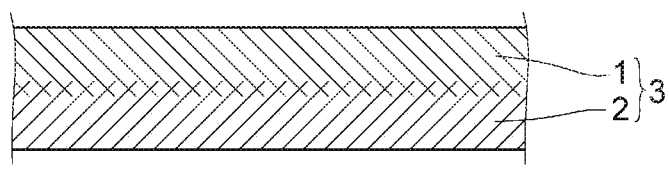
FIG. 3 is a cross-sectional view of one embodiment of the laminate of the present invention.
Figure 4:
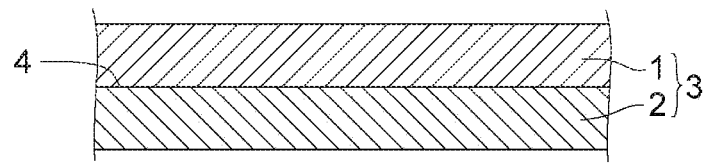
FIG. 4 is a cross-sectional view of another embodiment of the laminate of the present invention.

FIGS. 3 and 4 are cross-sectional views of the laminate of the present invention.

In a laminate 3 of the present invention, (1) the first member 1 and the second member 2 are bonded without having an interface (see FIG. 3), or (2) the first member 1 and the second member 2 are bonded with an interface at a boundary between the first member 1 and the second member 2 (see FIG. 4).

Referring to FIG. 3, in one embodiment, in the laminate 3 of the present invention, a material for forming the first member 1 and a material for forming the second member 2 are mixed between the first member 1 and the second member 2. The first member 1 and the second member 2 are firmly bonded in a state where the materials of the first member 1 and the second member 2 cannot be structurally separated from each other. A region represented by x in FIG. 3 is a region where the material of the first member 1 and the material of the second member 2 are mixed.

Referring to FIG. 4, in another embodiment, in the laminate 3 of the present invention, an interface 4 exists near a boundary between the first member 1 and the second member 2. However, this does not mean that the material of the first member 1 and the material of the second member 2 are clearly separated at the interface 4, but means that the materials can be structurally substantially separated from each other at the interface 4. The first member 1 and the second member 2 are firmly bonded at the interface 4.

In the laminate of the present invention, for example, the bonding strength between the first member and the second member is 3 kgf/2 cm or more (about 29.4 N/2 cm or more), and the first member and the second member are firmly bonded.

Such a laminate is obtained by using the first member and the second member in which A represented by the formula 1: A=−9×D+Wa−45 is more than zero. That is, the laminate is obtained by using the first member and the second member that satisfy a relationship of A>0.

Conventionally, in the field of so-called laser bonding, two members have been bonded with a bonding sheet interposed between the two members. One method of directly and firmly bonding the two members is to select a material for the two members so that the members are directly bonded by laser light. However, it is difficult to select the material.

According to the present invention, the first member and the second member can be directly and firmly bonded by laser light by using a material (the first thermoplastic polymer and the second thermoplastic polymer) satisfying the relationship of A>0. According to another aspect of the present invention, there is provided a screening method in which the first member and the second member can be easily selected when the first member and the second member are directly bonded by using laser light. That is, according to another aspect of the present invention, in directly bonding the first member and the second member by laser light, the first member and the second member are selected using A>0 as an index. The first member and the second member satisfying A>0 can be easily chosen based on the distance D of the Hansen solubility parameter and the work of adhesion Wa of the first member and the second member.

In the formula 1, there is no particular limitation as long as A is more than zero, but A is preferably 0.1 or more, and more preferably 0.5 or more. Although there is no particular upper limit for A, the upper limit is actually 20 or less.

The upper limit of the value of D in the formula 1 is not limited to a particular value, but is preferably 3 $(J/cm^3)^{1/2}$ or less, more preferably 2 $(J/cm^3)^{1/2}$ or less, and still more preferably 1 $(J/cm^3)^{1/2}$ or less. The lower limit of D is theoretically zero.

The value of Wa in the formula 1 is not limited to a particular value, but is preferably 45 to 70 mN/m, and more preferably 55 to 65 mN/m.

<Use of Laminate>

The use of the laminate of the present invention is not limited to a particular use. The laminate can be formed into an appropriate flat shape or three-dimensional shape and thickness depending on its application.

In the laminate of the present invention, the first member and the second member are firmly bonded by irradiation of laser light, and therefore the laminate can be suitably used as a constituting member of a product that can be used in a severe environment. A preferable use of such a laminate is a constituting member of a shoe. For example, the laminate of the present invention can be used as a shoe sole. The shoe sole has an outsole, and the outsole is formed of either the first member or the second member.

Preferably, the shoe sole has a midsole and the outsole stacked on and bonded to a lower surface of the midsole. The midsole is formed of one of the first member and the second member, and the outsole is formed of the other member. More preferably, the midsole is formed of the first member, and the outsole is formed of the second member.

Figure 5:
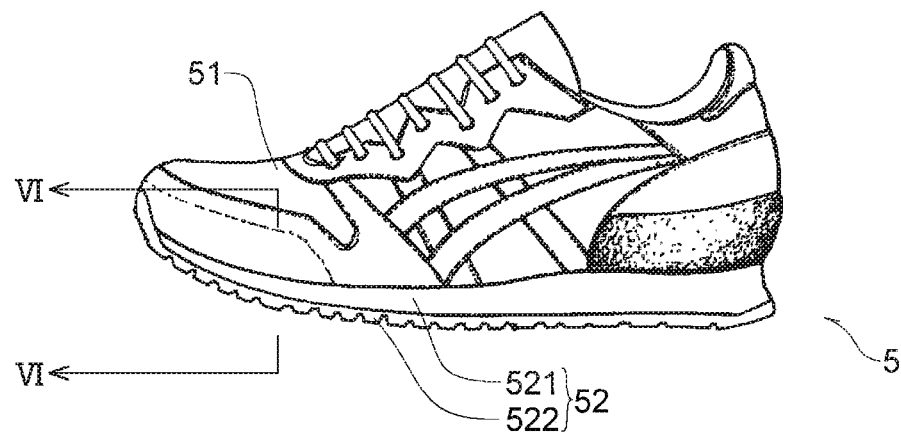
FIG. 5 is a side view of one embodiment of a shoe.
Figure 6:
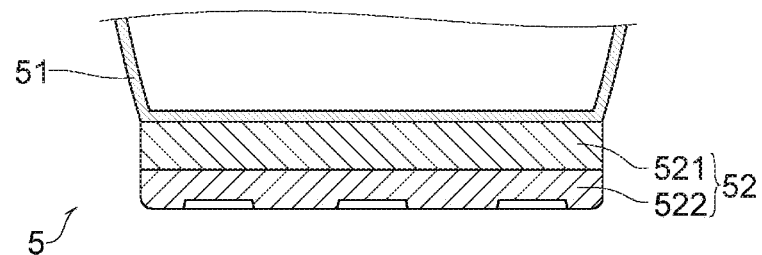
FIG. 6 is a cross-sectional view taken along the line VI-VI of FIG. 5.

FIGS. 5 and 6 show a shoe of one embodiment.

In FIGS. 2 and 3, a shoe 5 is, for example, a sports shoe. The shoe has a main body 51 covering an instep and a shoe sole 52 provided below the main body.

The illustrated shoe sole 52 includes a midsole 521 and an outsole 522 directly bonded below the midsole 521. For example, a non-foamed first member may be formed into a predetermined shape to form the midsole 521, and a foamed second member may be formed into a predetermined shape to form the outsole 522.

The outsole is a member of the shoe sole, which is in contact with the ground, and the midsole is a member of the shoe sole, which is interposed between the outsole and the main body.

EXAMPLES

The present invention will be further described in detail below with reference to Examples and Comparative Examples. Here, the present invention is not limited only to the following Examples.

[Used Materials]

(A) Thermoplastic Polymer

LDPE: Low density polyethylene. Product name "PETROSEN 226" manufactured by Tosoh Corporation.

HDPE: High density polyethylene. Product name "Nipolon Hard 1000" manufactured by Tosoh Corporation.

EVA1: Ethylene-vinyl acetate copolymer. Product name "ULTRASEN 540" manufactured by Tosoh Corporation.

EVA2: Ethylene-vinyl acetate copolymer. Product name "ULTRASEN 630" manufactured by Tosoh Corporation.

EVA3: Ethylene-vinyl acetate copolymer. Product name "ULTRASEN 631" manufactured by Tosoh Corporation.

SBS: Styrene butadiene styrene elastomer. Product name "TR2003" manufactured by JSR Corporation.

SIS: Styrene isoprene styrene elastomer. Product name "HYBRAR 7125F" manufactured by Kuraray Co., Ltd.

SEBS1: Styrene ethylene butylene styrene elastomer. Product name "Tuftec H1062" manufactured by Asahi Kasei Corporation.

SEBS2: Styrene ethylene butylene styrene elastomer. Product name "Tuftec H1041" manufactured by Asahi Kasei Corporation.

SEBS3: Styrene ethylene butylene styrene elastomer. Product name "Tuftec H1043" manufactured by Asahi Kasei Corporation.

ALLOY1: Mixture of 70 parts by mass of the LDPE and 30 parts by mass of EVA1.

ALLOY2: Mixture of 35 parts by mass of the LDPE, 35 parts by mass of HDPE, and 30 parts by mass of EVA1.

(B) Laser Absorbent

Carbon black: Carbon black master batch type. Product name "Black Grain 50" manufactured by Chiu88.

NIR1: Phthalocyanine compound. Product name "lumogen IR765" manufactured by BASF.

NIR2: Polycyclic compound. Product name "IR-T" manufactured by Showa Denko K.K.

(C) Various Additives

Filler: Soft calcium carbonate, manufactured by Maruo Calcium Co., Ltd.

Stearic acid: manufactured by New Japan Chemical Co., Ltd.

Zinc flower: Active zinc flower No. 2, manufactured by Honjo Chemical Corporation.

Crosslinking agent: Peroxide. Product name "PERCUMYL D" manufactured by NOF Corporation.

Crosslinking aid: Triallyl isocyanate. Product name "TAIC M60" manufactured by Nippon Kasei Co., Ltd.

Foaming agent: Azodicarbonamide. Product name "Vinyfor AC #3C" manufactured by Eiwa Chemical Ind. Co., Ltd.

[Preparation of First Member (Laser Transmissive Material)]

In the following procedure, a flat-plate-shaped first member having a thickness of 2 mm, a lateral length of 20 mm, and a longitudinal length of 50 mm was prepared. The first member was formed only of a thermoplastic polymer.

A first member made of LDPE (hereinafter, LDPE—first member) was prepared by molding LDPE by using an injection molding machine (nozzle temperature: about 200° C.).

A first member made of EVA1 (hereinafter, EVA1—first member), a first member made of EVA2 (hereinafter, EVA2—first member), and a first member made of EVA3 (hereinafter, EVA3—first member) were prepared by molding EVA1, 2, and 3, respectively, by using an injection molding machine (nozzle temperature: about 200° C.).

A first member made of SBS (hereinafter, SBS—first member) was prepared by molding SBS by using an injection molding machine (nozzle temperature: about 200° C.).

A first member made of SIS (hereinafter. SIS—first member) was prepared by molding SIS by using an injection molding machine (nozzle temperature: about 230° C.).

A first member made of SEBS1 (hereinafter, SEBS1—first member), a first member made of SEBS2 (hereinafter, SEBS2—first member), and a first member made of SEBS3 (hereinafter, SEBS3—first member) were prepared by molding SEBS1, 2, and 3, respectively, by using an injection molding machine (nozzle temperature: about 230° C.).

[Preparation of Second Member (Laser Absorbing Material)]

In the following procedure, a second member (hereinafter, LDPE(a)—second member) containing a flat-plate-shaped LDPE having a thickness of 4 mm, a lateral length of 20 mm, and a longitudinal length of 50 mm was prepared.

LDPE, a laser absorbent (carbon black), a filler, a foaming agent, a crosslinking agent, and the like were mixed in a mixing ratio shown in Table 1. The numerical values shown in Table 1 are indicated in parts by mass. The mixture was kneaded using a kneader, and then pressed at 160° C. at a pressure of 15 MPa for about 20 minutes using a pressing machine to thereby form the foam. The foam is the LDPE (a)—second member.

The mixing ratio was changed as shown in Table 1, and similarly, other second members containing LDPE (hereinafter, LDPE(b)—second member, LDPE(c)—second member, LDPE(d)—second member) were prepared.

The thermoplastic polymer and the mixing ratio were changed as shown in Table 1, and similarly, a second member containing EVA3 (hereinafter, EVA3—second member) was prepared.

The thermoplastic polymer and the mixing ratio were changed as shown in Table 1, and similarly, a second member containing SBS (hereinafter, SBS—second member) was prepared.

The thermoplastic polymer and the mixing ratio were changed as shown in Table 1, and similarly, a second member containing SIS (hereinafter, SIS—second member) was prepared.

The thermoplastic polymer and the mixing ratio were changed as shown in Table 1, and similarly, a second member containing ALLOY1 (hereinafter, ALLOY1—second member) was prepared.

The thermoplastic polymer and the mixing ratio were changed as shown in Table 1, and similarly, a second member containing ALLOY2 (hereinafter, ALLOY2—second member) was prepared.

TABLE 1

|  | LDPE(a)-second member | LDPE(b)-second member | LDPE(c)-second member |
|---|---|---|---|
| LDPE | 100.0 | 100.0 | 100.0 |
| HDPE |  |  |  |
| EVA3 |  |  |  |
| SBS |  |  |  |
| SIS |  |  |  |
| ALLOY1 |  |  |  |
| ALLOY2 |  |  |  |
| Carbon black | 10.0 | 1.0 |  |
| NIR1 |  |  | 0.5 |
| NIR2 |  |  |  |
| Filler | 5.0 | 5.0 | 5.0 |
| Stearic acid | 0.5 | 0.5 | 0.5 |
| Active zinc flower | 0.6 | 0.6 | 0.6 |
| Crosslinking agent | 1.4 | 1.4 | 1.4 |
| Crosslinking aid | 0.3 | 0.3 | 0.3 |
| Foaming agent | 6.0 | 5.5 | 6.0 |

|  | LDPE(d)-second member | EVA3-second member | SBS-second member |
|---|---|---|---|
| LDPE | 100.0 |  |  |
| HDPE |  |  |  |
| EVA3 |  | 100.0 |  |
| SBS |  |  | 100.0 |
| SIS |  |  |  |
| ALLOY1 |  |  |  |
| ALLOY2 |  |  |  |
| Carbon black |  | 10.0 | 10.0 |
| NIR1 |  |  |  |
| NIR2 | 0.5 |  |  |
| Filler | 5.0 | 5.0 | 5.0 |
| Stearic acid | 0.5 | 0.5 | 0.5 |
| Active zinc flower | 0.6 | 0.6 | 0.6 |
| Crosslinking agent | 1.4 | 0.5 | 0.2 |
| Crosslinking aid | 0.3 |  |  |
| Foaming agent | 6.0 | 3.0 | 4.0 |

TABLE 1-continued

| | SIS-second member | ALLOY1-second member | ALLOY2-second member |
|---|---|---|---|
| LDPE | | | |
| HDPE | | | |
| EVA3 | | | |
| SBS | | | |
| SIS | 100.0 | | |
| ALLOY1 | | 100.0 | |
| ALLOY2 | | | 100.0 |
| Carbon black | 10.0 | 10.0 | 10.0 |
| NIR1 | | | |
| NIR2 | | | |
| Filler | 5.0 | 5.0 | 5.0 |
| Stearic acid | 0.5 | 0.5 | 0.5 |
| Active zinc flower | 0.6 | 0.6 | 0.6 |
| Crosslinking agent | 1.2 | 1.13 | 1.13 |
| Crosslinking aid | 0.3 | 0.21 | 0.21 |
| Foaming agent | 0.8 | 4.4 | 44 |

[Calculation of Hansen Solubility Parameter]

The dispersion term $\delta_{d1}$, the polarity term $\delta_{p1}$, and the hydrogen bond term $\delta_{h1}$ in the Hansen solubility parameter of the thermoplastic polymer of the first member, and the dispersion term $\delta_{d2}$, the polarity term $\delta_{p2}$, and the hydrogen bond term $\delta_{h2}$ in the Hansen solubility parameter of the thermoplastic polymer of the second member were calculated as follows.

Based on the solubility parameter calculation method proposed by Charles Hansen (name of document: Hansen C. M.; Hansen Solubility Parameters, CRS Press (2000)), the Hansen solubility parameter was obtained by a software developed by Charles Hansen et al. (name of software: Hansen Solubility Parameter in Practice (HSPiP) Version 4.0.04). The calculation temperature used was 25° C. as a basic setting.

The results are shown in Table 2.

TABLE 2

| First member | $\delta d1$ $(J/cm^3)^{1/2}$ | $\delta p1$ $(J/cm^3)^{1/2}$ | $\delta h1$ $(J/cm^3)^{1/2}$ |
|---|---|---|---|
| LDPE-first member | 16.7 | 1.6 | 1.7 |
| EVA1-first member | 16.7 | 1.7 | 2.0 |
| EVA2-first member | 16.7 | 1.8 | 2.1 |
| EVA3-first member | 16.7 | 1.9 | 2.3 |
| SBS-first member | 17.6 | 2.1 | 3.7 |
| SIS-first member | 17.3 | 0.9 | 1.6 |
| SEBS1-first member | 16.6 | 1.4 | 2.4 |
| SEBS2-first member | 16.9 | 1.4 | 2.5 |
| SEBS3-first member | 17.8 | 1.3 | 2.8 |

| Second member | $\delta d2$ $(J/cm^3)^{1/2}$ | $\delta p2$ $(J/cm^3)^{1/2}$ | $\delta h2$ $(J/cm^3)^{1/2}$ |
|---|---|---|---|
| LDPE(a)-second member | 16.7 | 1.6 | 1.7 |
| LDPE(b)-second member | 16.7 | 1.6 | 1.7 |
| LDPE(c)-second member | 16.7 | 1.6 | 1.7 |
| LDPE(d)-second member | 16.7 | 1.6 | 1.7 |
| EVA3-second member | 16.7 | 1.9 | 2.3 |
| SBS-second member | 17.6 | 2.1 | 3.7 |
| SIS-second member | 17.3 | 0.9 | 1.6 |
| ALLOY1-second member | 16.7 | 1.6 | 1.8 |
| ALLOY2-second member | 16.7 | 1.6 | 1.8 |

[Measurement of Surface Free Energy]

The dispersion component $\gamma_{d1}$, the polarity component $\gamma_{p1}$, and the hydrogen bond component $\gamma_{h1}$ in the surface free energy of each of the first members were measured.

Similarly, the dispersion component $\gamma_{d2}$, the polarity component $\gamma_{p2}$, and the hydrogen bond component $y_{h2}$ in the surface free energy of each of the second members were measured.

The surface free energy was measured using a contact angle meter "DMs-401" manufactured by Kyowa Interface Science, Inc, and a liquid (water, diiodomethane, and ethylene glycol) whose components of the surface free energy were known. Specifically, a contact angle θ of the known liquid on the joint surface of the first member was measured at 23° C.±2° C. under 50% RH, using the contact angle meter, and each component ($\gamma_{d1}$, $\gamma_{p1}$, and $\gamma_{h1}$) of the surface free energy was determined using a multifunctional integrated software "FAMAS" manufactured by Kyowa Interface Science Inc. $\gamma_{d2}$, $\gamma_{p2}$, and $\gamma_{h2}$ of the surface free energy on the joint surface of the second member were determined in the same manner. The results are shown in Tables 3 to 4.

Measurement conditions for contact angle θ.
Measurement: Droplet method
Liquid amount: 1 μL
Recognition of droplet impingement: Automatic
Image processing: Algorithm-no reflection

TABLE 3

| | γd1 mN/m | γp1 mN/m | γh1 mN/m | Total mN/m |
|---|---|---|---|---|
| LOPE-first member | 29.2 | 0.8 | 0 | 30.0 |
| EVA1-first member | 28.0 | 1.4 | 0 | 29.4 |
| EVA2-first member | 27.6 | 1.8 | 0 | 29.4 |
| EVA3-first member | 27.3 | 8.3 | 0 | 35.6 |
| SBS-first member | 35.5 | 6.1 | 0 | 41.6 |
| SIS-first member | 21.6 | 6.7 | 0.3 | 28.6 |
| SEBS1-first member | 28.2 | 0 | 0 | 28.2 |
| SEBS2-first member | 30.2 | 0 | 0 | 30.2 |
| SEBS3-first member | 31.2 | 2.1 | 0 | 33.3 |

TABLE 4

| | γd2 mN/m | γp2 mN/m | γh2 mN/m | Total mN/m |
|---|---|---|---|---|
| LDPE(a)-second member | 32.2 | 0.2 | 0 | 32.4 |
| LDPE(b)-second member | 28.8 | 2.5 | 0 | 31.3 |
| LDPE(c)-second member | 29.4 | 2.5 | 0 | 31.9 |
| LDPE(d)-second member | 29.6 | 2.6 | 0 | 32.2 |
| EVA3-second member | 29.0 | 2.0 | 0 | 31.0 |
| SBS-second member | 29.3 | 1.0 | 0 | 30.3 |
| SIS-second member | 22.9 | 0 | 0.8 | 23.7 |
| ALLOY1-second member | 31.1 | 2.2 | 0 | 33.3 |
| ALLOY2-second member | 25.6 | 0 | 0.3 | 25.9 |

Examples 1 to 22 and Comparative Examples 1 to 16

The first and second members were combined as shown in Tables 5 and 6. D in Tables 5 and 6 represents the distance between the Hansen solubility parameter of the thermoplastic polymer of the first member and the Hansen solubility parameter of the thermoplastic polymer of the second member, and Wa represents the work of adhesion. Each D was obtained by substituting the numerical values of Table 2 into the formula 2: $D=\{4\times(\delta_{d1}-\delta_{d2})^2+(\delta_{p1}-\delta_{p2})^2+(\delta_{h1}-\delta_{h2})^2\}_{1/2}$, and each Wa was obtained by substituting the numerical values of Tables 3 and 4 into the formula 3: $Wa=2\times(\gamma_{d1}\times\gamma_{d2})_{1/2}+2\times(\gamma_{p1}\times\gamma_{p2})^{1/2}+2\times(\gamma_{h1}\times\gamma_{h2})^{1/2}$. A was calculated from the formula 1: $A=-9\times D+Wa-45$.

In each combination, the lower surface (joint surface) of the first member was superimposed on the upper surface (joint surface) of the second member, and laser light was applied from the upper surface side of the first member under the following conditions.

Laser irradiation apparatus: manufactured by Emerson Japan, Ltd.
Wavelength of laser light: 808 nm.
Laser light irradiation rate: See Tables 5 and 6.
Output of laser light per diode: 4.5 W.
Number of diodes: 25.
Laser light irradiation time: 5 seconds.

By applying laser light, the laminates of Examples 1 to 22 and Comparative Examples 1 to 16 in which the first member and the second member were bonded were obtained.

TABLE 5

|  | First member | Second member | Irradiation rate mm/sec |
|---|---|---|---|
| Example 1 | LDPE | LDPE(a) | 3.3 |
| Example 2 | EVA1 | LDPE(a) | 5.6 |
| Example 3 | EVA2 | LDPE(a) | 5.6 |
| Example 4 | EVA3 | LDPE(a) | 5.6 |
| Example 5 | SBS | LDPE(a) | 9.0 |
| Example 6 | SEBS1 | LDPE(a) | 10.0 |
| Example 7 | SEBS2 | LDPE(a) | 10.0 |
| Example 8 | SEBS3 | LDPE(a) | 10.5 |
| Example 9 | LDPE | EVA3 | 4.2 |
| Example 10 | EVA1 | EVA3 | 5.6 |
| Example 11 | EVA2 | EVA3 | 5.6 |
| Example 12 | EVA3 | EVA3 | 5.6 |
| Example 13 | SBS | EVA3 | 6.0 |
| Example 14 | SEBS1 | EVA3 | 8.0 |
| Example 15 | SEBS2 | EVA3 | 6.0 |
| Example 16 | SEBS3 | EVA3 | 6.0 |
| Example 17 | SBS | SBS | 14.0 |
| Example 18 | EVA2 | LDPE(b) | 5.6 |
| Example 19 | EVA2 | LDPE(c) | 5.6 |
| Example 20 | EVA2 | LDPE(d) | 1.9 |
| Example 21 | EVA2 | ALLOY1 | 7.5 |
| Example 22 | EVA2 | ALLOY2 | 7.5 |

|  | D $(J/cm^3)^{1/2}$ | Wa mN/m | A |
|---|---|---|---|
| Example 1 | 0.0 | 62.1 | 17.1 |
| Example 2 | 0.2 | 61.1 | 14.5 |
| Example 3 | 0.5 | 60.8 | 11.7 |
| Example 4 | 0.6 | 61.9 | 11.1 |
| Example 5 | 2.7 | 69.8 | 0.1 |
| Example 6 | 0.8 | 60.3 | 8.4 |
| Example 7 | 0.9 | 62.4 | 9.5 |
| Example 8 | 2.1 | 64.7 | 0.5 |
| Example 9 | 0.6 | 60.7 | 10.0 |
| Example 10 | 0.5 | 60.3 | 11.1 |
| Example 11 | 0.2 | 60.4 | 13.8 |
| Example 12 | 0.0 | 64.4 | 19.4 |
| Example 13 | 2.3 | 71.2 | 5.3 |
| Example 14 | 0.6 | 57.2 | 7.1 |
| Example 15 | 0.7 | 61.9 | 10.9 |
| Example 16 | 2.0 | 64.3 | 1.7 |
| Example 17 | 0.0 | 69.4 | 24.4 |
| Example 18 | 0.4 | 60.6 | 11.6 |
| Example 19 | 0.4 | 61.2 | 12.2 |
| Example 20 | 0.4 | 61.5 | 12.5 |
| Example 21 | 0.4 | 62.6 | 14.3 |
| Example 22 | 0.4 | 53.2 | 4.9 |

|  | Bonding strength kgf/2 cm | Conditions after delamination |
|---|---|---|
| Example 1 | 4.5 | Material rupture |
| Example 2 | 4.3 | Material rupture |
| Example 3 | 4.2 | Material rupture |
| Example 4 | 4.3 | Material rupture |
| Example 5 | 5.0 | Material rupture |
| Example 6 | 4.2 | Material rupture |
| Example 7 | 4.1 | Material rupture |
| Example 8 | 4.2 | Material rupture |
| Example 9 | 3.2 | Material rupture |
| Example 10 | 4.4 | Material rupture |
| Example 11 | 4.8 | Material rupture |
| Example 12 | 4.9 | Material rupture |
| Example 13 | 4.5 | Material rupture |
| Example 14 | 4.2 | Interfacial delamination |
| Example 15 | 4.8 | Material rupture |
| Example 16 | 3.8 | Material rupture |
| Example 17 | 5.2 | Material rupture |
| Example 18 | 3.3 | Material rupture |
| Example 19 | 4.7 | Material rupture |
| Example 20 | 3.1 | Material rupture |
| Example 21 | 4.0 | Material rupture |
| Example 22 | 4.2 | Material rupture |

TABLE 6

|  | First member | Second member | Irradiation rate mm/sec |
|---|---|---|---|
| Comparative Example 1 | SIS | EVA3 | 6.0 |
| Comparative Example 2 | LDPE | SBS | 5.0 |
| Comparative Example 3 | EVA1 | SBS | 5.6 |
| Comparative Example 4 | SIS | SBS | 7.0 |
| Comparative Example 5 | SEBS1 | SBS | 8.0 |
| Comparative Example 6 | SEBS2 | SBS | 6.0 |
| Comparative Example 7 | SEBS3 | SBS | 6.0 |
| Comparative Example 8 | LDPE | SIS | 5.0 |
| Comparative Example 9 | EVA1 | SIS | 4.7 |
| Comparative Example 10 | EVA2 | SIS | 4.7 |
| Comparative Example 11 | EVA3 | SIS | 7.5 |
| Comparative Example 12 | SBS | SIS | 5.0 |
| Comparative Example 13 | SIS | SIS | 5.0 |
| Comparative Example 14 | SEBS1 | SIS | 5.0 |
| Comparative Example 15 | SEBS2 | SIS | 7.9 |
| Comparative Example 16 | SEBS3 | SIS | 5.0 |

|  | D $(J/cm^3)^{1/2}$ | Wa mN/m | A |
|---|---|---|---|
| Comparative Example 1 | 2.2 | 57.4 | −7.8 |
| Comparative Example 2 | 2.7 | 60.3 | −9.4 |
| Comparative Example 3 | 2.6 | 59.7 | −9.0 |
| Comparative Example 4 | 4.1 | 55.5 | −26.1 |
| Comparative Example 5 | 2.4 | 57.5 | −9.6 |
| Comparative Example 6 | 2.1 | 59.5 | −4.1 |

TABLE 6-continued

| | | | | Bonding strength kgf/2 cm | Conditions after delamination |
|---|---|---|---|---|---|
| Comparative Example 7 | 3.4 | 63.4 | −12.3 | 2.1 | Interfacial delamination |
| Comparative Example 8 | 1.4 | 51.7 | −6.0 | 0.1 | Interfacial delamination |
| Comparative Example 9 | 1.5 | 50.6 | −8.0 | 0.2 | Interfacial delamination |
| Comparative Example 10 | 1.6 | 50.3 | −9.1 | 0.4 | Interfacial delamination |
| Comparative Example 11 | 1.7 | 50.0 | −10.3 | 0.3 | Interfacial delamination |
| Comparative Example 12 | 2.5 | 57.0 | −10.2 | 1.9 | Interfacial delamination |
| Comparative Example 13 | 0.0 | 45.0 | 0.0 | 2.1 | Interfacial delamination |
| Comparative Example 14 | 1.7 | 50.8 | −9.2 | 0.9 | Interfacial delamination |
| Comparative Example 15 | 1.3 | 52.6 | −4.3 | 2.2 | Interfacial delamination |
| Comparative Example 16 | 1.6 | 53.5 | −5.6 | 2.5 | Interfacial delamination |
| Comparative Example 1 | | | | 1.7 | Interfacial delamination |
| Comparative Example 2 | | | | 0.7 | Interfacial delamination |
| Comparative Example 3 | | | | 1.9 | Interfacial delamination |
| Comparative Example 4 | | | | 1.5 | Interfacial delamination |
| Comparative Example 5 | | | | 1.5 | Interfacial delamination |
| Comparative Example 6 | | | | 2.8 | Interfacial delamination |

[Peel Test]

The laminates of Examples and Comparative Examples were subjected to a peel test using a tensile tester.

Specifically, for each laminate, the edge of the first member and the edge of the second member were held by respective chucks of the tensile tester, and both the chucks were moved away from each other at a drawing speed of 50 mm/min to thereby delaminate the first member and the second member at a 180° angle. In other words, the edge of the first member and the edge of the second member were drawn at a drawing speed of 50 mm/min so as to break away in the direction of about 180° angle. Then, the maximum stress when the first member and the second member were separated was defined as the bonding strength.

The results are shown in Tables 5 and 6.

In addition, the state after the peel test was visually observed. The results are shown in Tables 5 and 6.

In the conditions after delamination in Tables 5 and 6, "material rupture" means that the first member and the second member were not delaminated at the interface thereof and the second member itself was ruptured, and "interfacial delamination" means that the first member and the second member were delaminated at the interface thereof.

Figure 7:
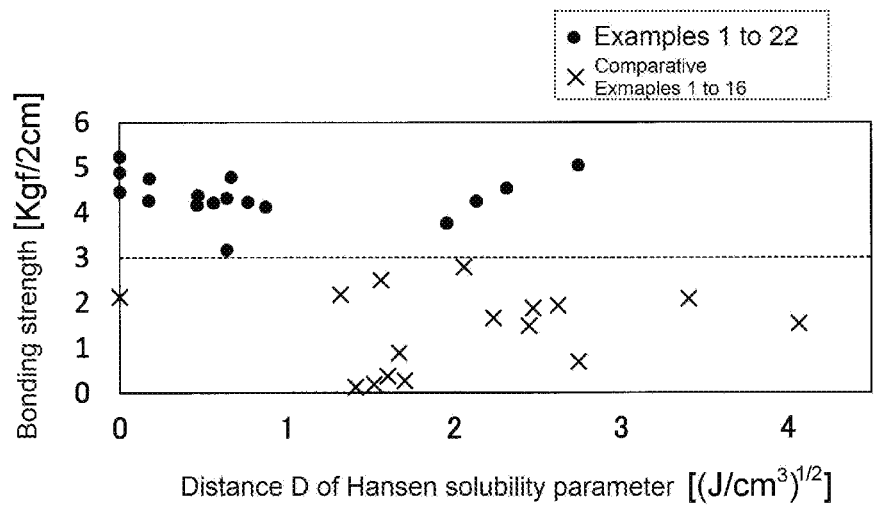
FIG. 7 is a graph showing a relationship between D and bonding strength in each of Examples and Comparative Examples.
Figure 8:
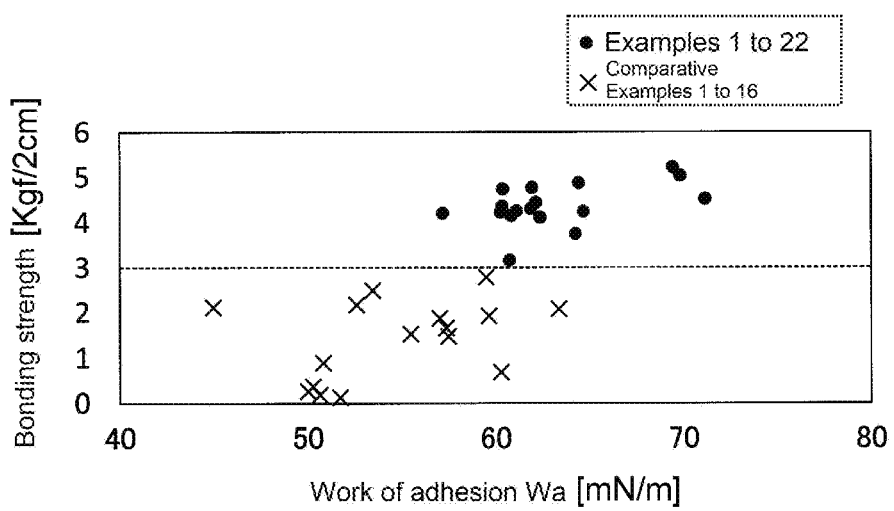
FIG. 8 is a graph showing a relationship between Wa and the bonding strength in each of Examples and Comparative Examples.

FIGS. 7 and 8 are graphs showing the results of the peel test, FIG. 7 shows a relationship between the distance of the solubility parameter and the bonding strength in each of Examples and Comparative Examples, and FIG. 8 shows a relationship between the work of adhesion and the bonding strength in each of Examples and Comparative Examples.

When the bonding strength is 3 kgf/2 cm or more (about 29.4 N/2 cm or more), it can be said that the first member and the second member are bonded with sufficient strength. As is clear from the graphs, in all the examples, the bonding strength was 3 kgf/2 cm or more.

Figure 9:
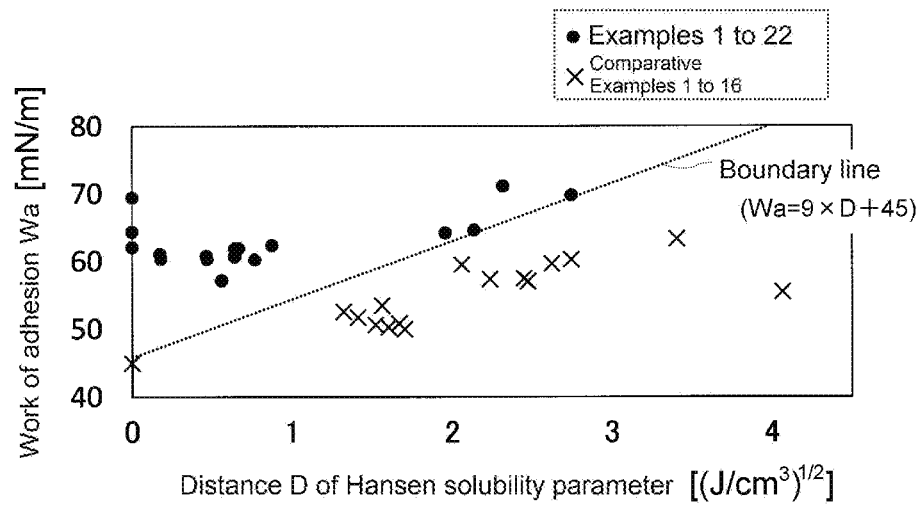
FIG. 9 is a graph showing a relationship between D and Wa in each of Examples and Comparative Examples.

FIG. 9 is a graph showing a relationship between the distance of the solubility parameter and the work of adhesion in each of Examples and Comparative Examples. The horizontal axis represents the distance of the solubility parameter, and the vertical axis represents the work of adhesion. Examples were gathered in approximately the upper half (especially the upper half and the left half) of the graph, and on the contrary, Comparative Examples were gathered in the lower half of the graph. In the graph, a boundary line between Examples and Comparative Examples was drawn, and the equation of the boundary was $Wa=9 \times D+45$. It is presumed that an upper right region of the boundary line is a region corresponding to a combination of the first member and the second member bonded with sufficient bonding strength. This region is a region satisfying $Wa-9 \times D-45>0$.

Figure 10:
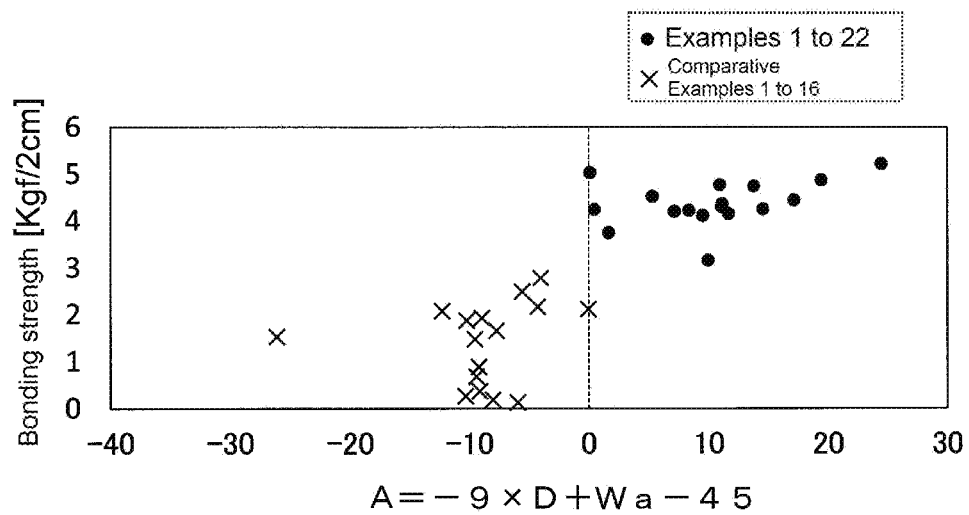
FIG. 10 is a graph showing a relationship between the bonding strength and A in each of Examples and Comparative Examples.

FIG. 10 is a graph showing a relationship between A and the bonding strength, where $-9 \times D+Wa-45=A$ determined in FIG. 9 is plotted on the horizontal axis. All examples are included in a region where A is more than zero (region where A>0), and all comparative examples are included in a region where A is zero or less.

INDUSTRIAL APPLICABILITY

The laminate of the present invention can be used as a constituting member of a shoe and a sporting product, for example.

REFERENCE SIGNS LIST

1 First member
2 Second member
3 Laminate
5 Shoe
51 Main body of shoe
52 Shoe sole of shoe
521 Midsole
522 Outsole

The invention claimed is:

1. A laminate comprising:
a first member which contains at least one thermoplastic polymer and through which laser light is transmitted; and
a second member which contains at least one thermoplastic polymer and absorbs laser light, wherein the first member is directly bonded to the second member and no bonding sheet is arranged between the first member and the second member, and
A represented by the following formula 1 is more than zero, $$A = -9 \times D + Wa - 45 \quad \text{Formula 1:}$$

wherein D represents a distance between a Hansen solubility parameter of the thermoplastic polymer of the first member and a Hansen solubility parameter of the thermoplastic polymer of the second member calculated according to the following formula 2, Wa represents work of adhesion calculated from each surface free energy of the first member and the second member according to the following formula 3, $$D = \{4 \times (\delta_{d1} - \delta_{d2})^2 + (\delta_{p1} - \delta_{p2})^2 + (\delta_{h1} \delta_{h2})^2\}^{1/2} \quad \text{Formula 2:}$$

wherein $\delta_{d1}$, $\delta_{p1}$, and $\delta_{h1}$ represent a dispersion term, a polarity term, and a hydrogen bond term, respectively, in the Hansen solubility parameter of the thermoplastic polymer of the first member, $\delta_{d2}$, $\delta_{p2}$, and $\delta_{h2}$ represent a dispersion term, a polarity term, and a hydrogen bond term, respectively, in the Hansen solubility parameter of the thermoplastic polymer of the second member, $$Wa = 2 \times (\gamma_{d1} \times \gamma_{d2})^{1/2} + 2 \times (\gamma_{p1} \times \gamma_{p2})^{1/2} + 2 \times (\gamma_{h1} \times \gamma_{h2})^{1/2} \quad \text{Formula 3:}$$

wherein $\gamma_{d1}$, $\gamma_{p1}$, and $\gamma_{h1}$ represent a dispersion component, a polarity component, and a hydrogen bond component, respectively, in the surface free energy of the first member, and $\gamma_{d2}$, $\gamma_{p2}$, and $\gamma_{h2}$ represent a dispersion component, a polarity component, and a hydrogen bond component, respectively, in the surface free energy of the second member, and wherein the at least one thermoplastic polymer in the first member comprises 100% of the total amount of polymer in the first member and the at least one thermoplastic polymer in the second member comprises 100% of the total amount of polymer in the second member.

2. The laminate according to claim 1, wherein the first member is formed of a non-foamed material, and the second member is formed of a foam.

3. A shoe sole comprising an outsole,
wherein the outsole includes one of the first member and the second member according to claim 1.

4. A shoe comprising the shoe sole according to claim 3.

* * * * *